US009004341B2

(12) United States Patent
Shitamoto

(10) Patent No.: US 9,004,341 B2
(45) Date of Patent: Apr. 14, 2015

(54) METHOD FOR PRODUCING WELDED STEEL PIPE AND WELDED STEEL PIPE

(75) Inventor: Hidenori Shitamoto, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/241,478

(22) PCT Filed: Aug. 30, 2012

(86) PCT No.: PCT/JP2012/071970

§ 371 (c)(1), (2), (4) Date: Feb. 27, 2014

(87) PCT Pub. No.: WO2013/031879

PCT Pub. Date: Mar. 7, 2013

(65) Prior Publication Data

US 2014/0202576 A1 Jul. 24, 2014

(30) Foreign Application Priority Data

Aug. 30, 2011 (JP) ................................ 2011-186782

(51) Int. Cl.

| | |
|---|---|
| ***B23K 31/02*** | (2006.01) |
| ***B21D 39/08*** | (2006.01) |
| ***B29D 23/00*** | (2006.01) |
| ***B32B 1/08*** | (2006.01) |
| ***B21D 31/04*** | (2006.01) |

(Continued)

(52) U.S. Cl.

CPC . *B21D 31/04* (2013.01); *B21D 3/14* (2013.01); *B21D 39/20* (2013.01); *B21C 37/087* (2013.01); *B21C 37/30* (2013.01); *B23K 31/027* (2013.01); *B23K 2201/06* (2013.01); *B23K 2203/04* (2013.01); *B21C 37/08* (2013.01); *F16L 9/02* (2013.01)

(58) Field of Classification Search

None

See application file for complete search history.

(56) References Cited

U.S. PATENT DOCUMENTS 3,513,682 A * 5/1970 Rowell ............................ 72/283
3,716,908 A * 2/1973 Rowell .......................... 228/103

(Continued)

FOREIGN PATENT DOCUMENTS

GB 2035856 A * 6/1980
JP 49-065980 6/1974

(Continued)

OTHER PUBLICATIONS

Hidenori Shitamoto et al., "Evaluation of . . . Fe Analysis", 8th International Pipeline Conference, vol. 4, pp. 213-219, Sep. 27-Oct. 1, 2010.

*Primary Examiner* — Kiley Stoner

(74) *Attorney, Agent, or Firm* — Clark & Brody

(57) ABSTRACT

Provided is a method for producing a welded steel pipe having excellent buckling resistance. The method for producing a welded steel pipe according to the present embodiment includes steps of: preparing a welded pipe, and expanding the welded pipe over the entire length thereof by using a pipe expanding head such that an undulation wavelength ratio D defined by Formula (1) is not more than 0.8, or not less than 1.8:

$$D=p/\lambda \quad (1),$$

where p is an undulation wavelength in the axial direction of the welded steel pipe, and λ is a Timoshenko's buckling wavelength as defined by Formula (2):

$$\lambda=3.44\times(r\times t)^{1/2} \quad (2),$$

where r is an inner radius of the welded steel pipe and t is a wall thickness of the welded steel pipe.

3 Claims, 7 Drawing Sheets

(51) Int. Cl.

| | |
|---|---|
| ***B21C 37/087*** | (2006.01) |
| ***B21C 37/30*** | (2006.01) |
| ***B21C 37/08*** | (2006.01) |
| ***F16L 9/02*** | (2006.01) |
| *B21D 3/14* | (2006.01) |
| *B21D 39/20* | (2006.01) |

(56) References Cited

U.S. PATENT DOCUMENTS

| | | | | | |
|---|---|---|---|---|---|
| 3,977,068 | A * | 8/1976 | Krips | ...................... | 29/890.044 |
| 4,232,541 | A * | 11/1980 | Stump | ............................ | 72/283 |
| 4,331,281 | A * | 5/1982 | Klebl et al. | .................. | 228/125 |
| 4,487,663 | A * | 12/1984 | Hara et al. | ................... | 205/154 |
| 2004/0031337 | A1 * | 2/2004 | Masaniello et al. | ......... | 73/865.8 |

FOREIGN PATENT DOCUMENTS

| | | | |
|---|---|---|---|
| JP | 53-104563 | | 9/1978 |
| JP | 08-300069 | | 11/1996 |
| JP | 11-188485 | A * | 7/1999 |
| JP | 2006-289439 | | 10/2006 |
| JP | 2008-307594 | | 12/2008 |
| JP | 2010-230107 | | 10/2010 |

* cited by examiner 100
101
102
103
104
105
106
110
12
12A
12B

METHOD FOR PRODUCING WELDED STEEL PIPE AND WELDED STEEL PIPE

TECHNICAL FIELD

The present invention relates to a method for producing a steel pipe, and a steel pipe, and more specifically to a method for producing a welded steel pipe, and a welded steel pipe.

BACKGROUND ART

Pipelines are used for transmitting petroleum, natural gas, and the like. Such pipelines are made up of a plurality of line pipes. For the line pipes, welded steel pipes represented by a UOE steel pipe are used, for example.

A welded steel pipe is produced by, for example, the following method. Widthwise end portions of a steel plate are bent by a C-press (C-forming). The C-formed steel plate is bent by a U-press (U-forming). The U-formed steel plate is bent by an O-press (O-forming). As a result, a substantially circular open pipe is obtained in which the widthwise end portions of the steel plate are opposed to each other. In the open pipe, the widthwise end portions opposing each other in the circumferential direction are tack welded. Thereafter, inner surface welding and outer surface welding are performed on the open pipe. Through the processes described above, a welded pipe is obtained. In order to improve the roundness of the welded pipe, the welded pipe is expanded by a pipe expanding machine. As a result, a targeted welded steel pipe (a UOE steel pipe in this example) is produced.

An example of the pipe expanding machine is disclosed in, for example, JP2006-28439A. The pipe expanding machine includes a pipe expanding head. The pipe expanding head expands the welded pipe over its entire length while moving in the axial direction of the welded pipe relative to the welded pipe.

DISCLOSURE OF THE INVENTION

When an expanded welded steel pipe is used for a pipeline, the welded steel pipe is required to have excellent buckling resistance. The pipeline may be laid in a permafrost region of cold climates such as Canada, or a seismic region such as Japan. When the Earth's surface moves in the vertical direction as a result of the melting of permafrost and the occurrence of earthquake, the welded steel pipe constituting the pipeline is subjected to such movement. It is preferable that the welded steel pipe can suppress the occurrence of buckling even if it is subjected to such movement.

It is an object of the present invention to provide a method for producing a welded steel pipe which has excellent buckling resistance.

A method for producing a welded steel pipe according to an embodiment of the present invention includes the steps of: preparing a welded pipe; and expanding the welded pipe over an entire length thereof by using a pipe expanding head to form a welded steel pipe such that an undulation wavelength ratio D defined by Formula (1) is not more than 0.8, or not less than 1.8:

$$D=p/\lambda \quad (1)$$

where p is an undulation wavelength in an axial direction of the welded steel pipe, and λ is a Timoshenko's buckling wavelength defined by the following Formula (2):

$$\lambda=3.44\times(r\times t)^{1/2} \quad (2)$$

where r is an inner radius of the welded steel pipe, and t is a wall thickness of the welded steel pipe.

The method for producing a welded steel pipe according to the embodiment of the present invention enables the production of a welded steel pipe having excellent buckling resistance.

DESCRIPTION OF EMBODIMENTS

Figure 1:
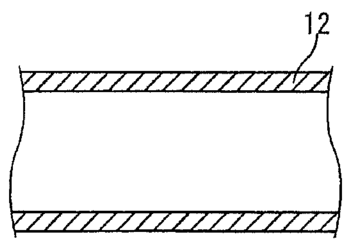
FIG. 1 is a sectional view of a welded pipe.

The present inventors have conducted investigation and research on the buckling resistance of a welded steel pipe. As a result, the present inventors have obtained the following findings.

(A) When a welded steel pipe is expanded over its entire length by using a pipe expanding head of a pipe expanding machine, the welded steel pipe will have undulation in its axial direction. The undulation in the axial direction has a periodicity. In other words, the undulation in the axial direction has a wavelength. The undulation wavelength in the axial direction is formed in a pipe expansion step. The undulation wavelength is determined based on a relative movement pitch of the pipe expanding head with respect to the welded pipe.

(B) The buckling resistance of a welded steel pipe is significantly affected by the undulation wavelength. Specifically, when the undulation wavelength is given as a Timoshenko's buckling wavelength λ (mm) defined by Formula (2), the buckling resistance of the welded steel pipe becomes minimum:

$$\lambda=3.44\times(r\times t)^{1/2} \quad (2)$$

where, r (mm) is an inner radius of the welded steel pipe, and t is a wall thickness (mm) of the welded steel pipe.

(C) If the undulation wavelength of the welded steel pipe formed in the pipe expansion step has a different value from the Timoshenko's buckling wavelength λ, the buckling resistance of the welded steel pipe will be improved.

(D) More specifically, when the undulation wavelength of a welded steel pipe is p (mm), it is possible to improve the buckling resistance of the welded steel pipe by expanding the welded pipe over its entire length in the pipe expansion step such that an undulation wavelength ratio D defined by Formula (1) is not more than 0.8 or not less than 1.8.

$$D=p/\lambda \quad (1)$$

Based on the above described findings, the present inventors have completed the following invention.

A method for producing a welded steel pipe according to an embodiment of the present invention includes the steps of: preparing a welded pipe; and expanding the welded pipe over an entire length thereof by using a pipe expanding head to form a welded steel pipe such that an undulation wavelength ratio D defined by Formula (1) is not more than 0.8, or not less than 1.8.

In this case, a welded steel pipe having excellent buckling resistance is produced.

Preferably, the step of expanding the welded pipe over the entire length thereof includes the substeps of: setting a movement pitch of the pipe expanding head such that the undulation wavelength ratio is not more than 0.8 or not less than 1.8; and expanding the welded pipe over the entire length thereof at the set movement pitch.

In this case, the undulation wavelength p to be formed in the welded steel pipe will assume a different value from the buckling wavelength λ. As a result, the buckling resistance of the welded steel pipe will be improved.

A welded steel pipe according to an embodiment of the present invention is produced by being expanded over an entire length thereof, and has an undulation in an axial direction thereof. And an undulation wavelength ratio D determined by Formula (1) is not more than 0.8, or not less than 1.8.

Hereafter, a welded steel pipe according to an embodiment of the present invention will be described with reference to the drawings. The same or corresponding parts in the drawings are given the same reference symbols, and description thereof will not be repeated.

[Method for Producing Welded Steel Pipe]

The method for producing a welded steel pipe includes the steps of: preparing a welded pipe, and expanding the welded pipe to produce a welded steel pipe. The step of preparing a welded pipe is referred to as a "preparation step", and the step of expanding the welded pipe to produce a welded steel pipe is referred to as a "pipe expansion step." Each step will be described in detail.

[Preparation Step]

First, a welded pipe 12 shown in FIG. 1 is prepared. In the present embodiment, the welded pipe 12 is, for example, a UOE pipe.

When the welded pipe 12 is a UOE pipe, the welded pipe 12 is produced by the following method. First, a steel plate is prepared. The prepared steel plate is subjected to C-forming, U-forming, and O-forming in this order. As a result, a substantially circular open pipe is obtained in which widthwise end portions of the steel plate oppose each other.

The widthwise end portions opposing each other in the circumferential direction in the open pipe are tack welded. Thereafter, inner surface welding and outer surface welding are performed on the open pipe. As a result, the welded pipe 12 (see FIG. 1) is produced.

[Pipe Expansion Step]

Figure 2:
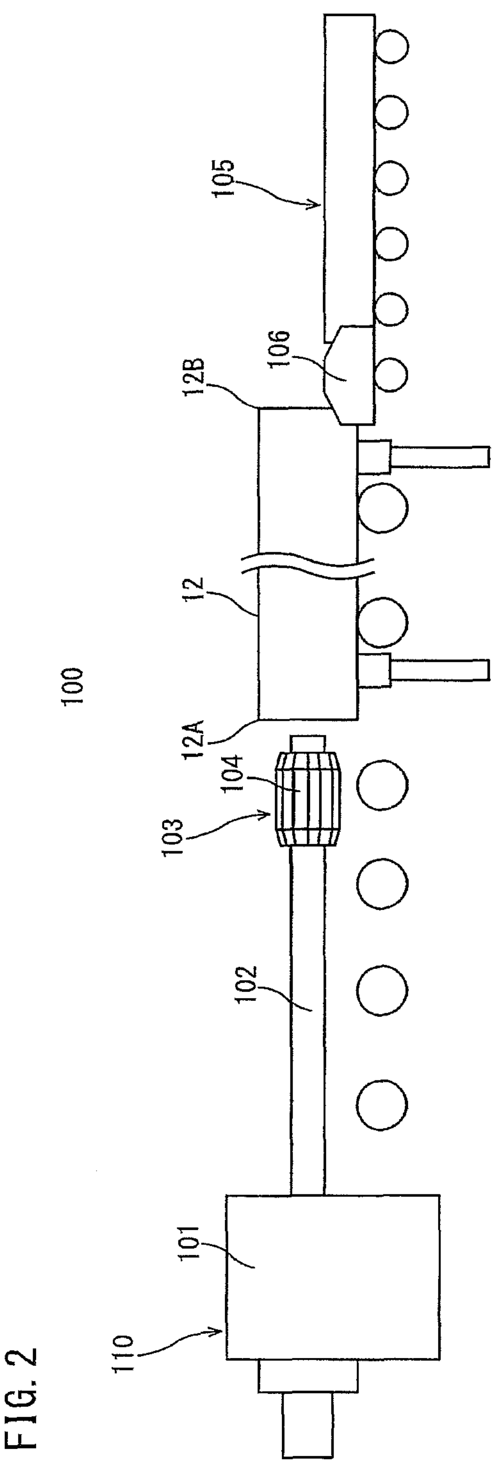
FIG. 2 is a side view of a pipe expanding machine.

The welded pipe 12 is expanded over its entire length by using a pipe expanding machine. FIG. 2 is a side view of a pipe expanding machine 100. The pipe expanding machine 100 includes a main body 110 and an axial in-feed 105. The main body 110 includes a main cylinder 101, a shaft-shaped horn 102, and a pipe expanding head 103. The main body 110 is disposed on one end 12A side of the welded pipe 12. The axial in-feed 105 is disposed on the other end 12B side of the welded pipe 12.

A rear end of the pipe expanding head 103 is attached to a front end of the horn 102. A front end of the pipe expanding head 103 opposes the end 12A of the welded pipe 12. The rear end of the horn 102 is attached to the main cylinder 101.

In the pipe expanding head 103, which has a columnar shape, a plurality of dies 104 are disposed in the circumferential direction. When a drawbar (not shown) in the horn 102 is drawn in the axial direction, the plurality of dies 104 expand due to a wedge effect. More specifically, the dies 104 move in the radial direction of the pipe expanding head 103 and expand. In this occasion, the plurality of dies 104 force open and expand the welded pipe 12. When the drawbar is put back, the plurality of dies 104 return to the original position as well, and one cycle of pipe expanding operation is completed.

The axial in-feed 105 is disposed on the end 12B side of the welded pipe 12. The axial in-feed 105 includes a gripper 106. The gripper 106 grips the end 12B of the welded pipe 12. The axial in-feed 105 moves in the axial direction at a predetermined movement pitch while gripping the welded pipe 12 with the gripper 106. As a result, the welded pipe 12 is fed to the main body 110 side in the axial direction at the predetermined movement pitch. As a result, the pipe expanding head 103 moves to the axial in-feed 105 side relative to the welded pipe 12.

After the axial in-feed 105 has fed the welded pipe 12 by one cycle of movement pitch, one cycle of pipe expanding operation by the pipe expanding head 103 is performed.

Figure 3:
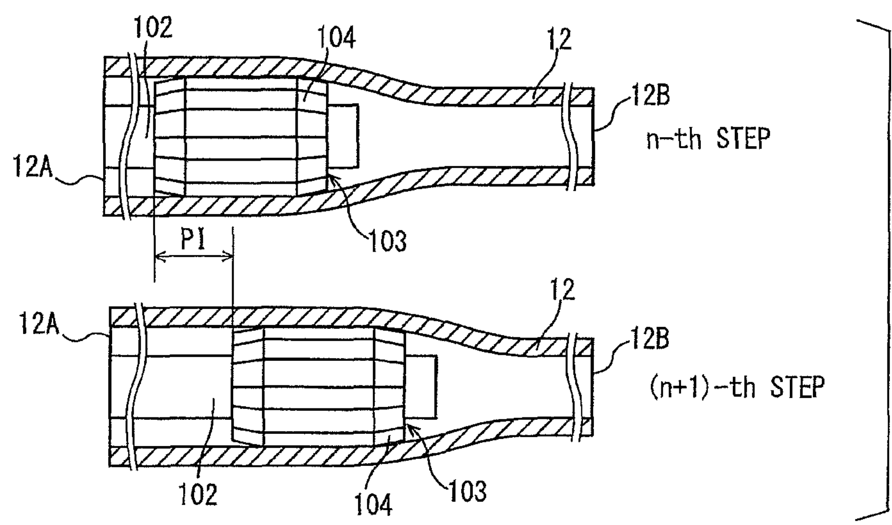
FIG. 3 is a partial sectional view showing a pipe expansion step of a welded steel pipe according to the present embodiment.

FIG. 3 is a schematic diagram of the pipe expanding operation. Referring to FIG. 3, the pipe expanding head 103 moves, as described above, relatively from the end 12A side to the end 12B side in the welded pipe 12. FIG. 3 shows the positions of the pipe expanding head 103 in the n-th step and the (n+1)-th step. After the pipe expanding operation in the n-th step is completed, the axial in-feed 105 feeds the welded pipe 12 to the main body 110 side (end 12A side) by a movement pitch PI in the (n+1)-th step. As a result, the pipe expanding head 103 moves to the axial in-feed 105 side (end 12B side) relative to the welded pipe 12 by the movement pitch PI. After the movement, the plurality of dies 104 of the pipe expanding head 103 are expanded to expand the welded pipe 12. The above described movement pitch PI corresponds to a moved distance per one cycle of pipe expanding operation.

The movement pitch PI is appropriately altered depending on, for example, the shape of the pipe expanding head 103, the driving force of the axial in-feed 105 (external force to feed the welded pipe 12), the chemical composition and strength grade of the welded pipe 12, the wall thickness of the welded pipe 12, and the like.

The pipe expanding head 103 repeats the pipe expanding operation as it moves by the movement pitch PI, and relatively moves from the end 12A to the end 12B in the welded pipe 12. By the above described processes, the pipe expanding head 103 expands the welded pipe 12 over its entire length to produce a welded steel pipe.

Figure 4:
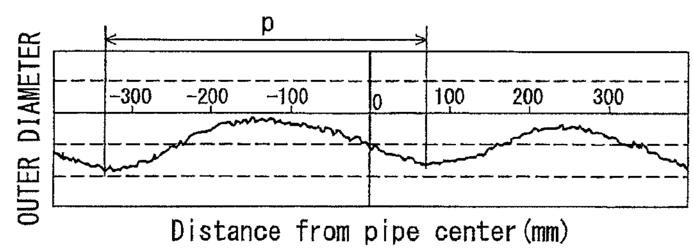
FIG. 4 is a graph showing an undulation of the surface of a produced welded steel pipe.

FIG. 4 is a schematic diagram showing an undulation in the axial direction of the outer surface of the produced welded steel pipe. The abscissa of FIG. 4 indicates the axial distance of the welded steel pipe (the center of the welded steel pipe in the axial direction is defined as "0") and the ordinate of FIG. 4 indicates the amount of undulation. As shown in FIG. 4, the outer surface property of the welded steel pipe is not constant, and has an undulation with a wavelength p in the axial direction. Hereafter, the wavelength p is referred to as an "undulation wavelength."

The undulation wavelength p corresponds to the movement pitch PI. More specifically, the undulation wavelength p is substantially the same as the movement pitch.

It is inferred that the above described undulation of the surface of the welded steel pipe occurs from the following reason. As shown in FIG. 3, the rear portion of the (n+1)-th pipe expansion region overlaps the front portion of the n-th pipe expansion region. When pipe expansion is performed while avoiding overlapped portions, a portion in which pipe expansion is not performed may occur between the (n+1)-th and n-th pipe expansion regions. In order to avoid such a case, the pipe expansion is performed in such a way that the pipe expansion portions of the (n+1)-th and the n-th partially overlap. It is inferred that the existence of such an overlap portion causes the occurrence of undulation in the axial direction of the surface of the welded steel pipe.

In a welded steel pipe, when the undulation wavelength p is equal to the Timoshenko's buckling wavelength λ defined by Formula (2), the deformability of the welded steel pipe becomes minimum, and buckling occurs.

$$\lambda=3.44\times(r\times t)^{1/2} \tag{2}$$

Figure 5:
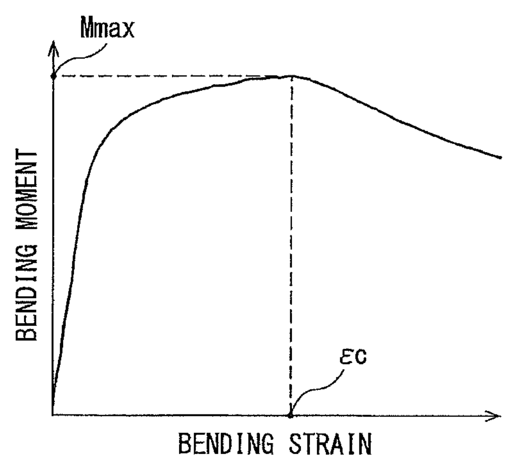
FIG. 5 is a graph showing a typical relationship between bending moment and bending strain.

FIG. 5 is a diagram showing a typical relationship between bending moment and bending strain, when a bending moment is applied to a welded steel pipe. When the bending moment reaches a maximum bending moment Mmax, buckling occurs. The bending strain at the maximum bending moment Mmax is defined as a critical bending strain $\epsilon c$. The larger the critical bending strain $\epsilon c$ is, the higher the buckling resistance of the welded steel pipe becomes.

In the pipe expansion step, the welded pipe is expanded over its entire length such that the undulation wavelength ratio D defined by Formula (1) is not more than 0.8 or not less than 1.8 in the produced welded steel pipe. As a result, the buckling resistance of the produced welded steel pipe is improved. The reason of that is as follows.

Figure 6:
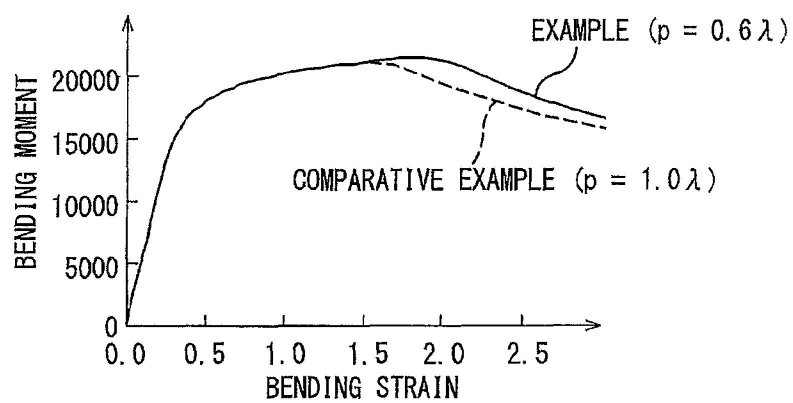
FIG. 6 is a graph showing a relationship between bending moment and bending strain of a welded steel pipe.
Figure 7:
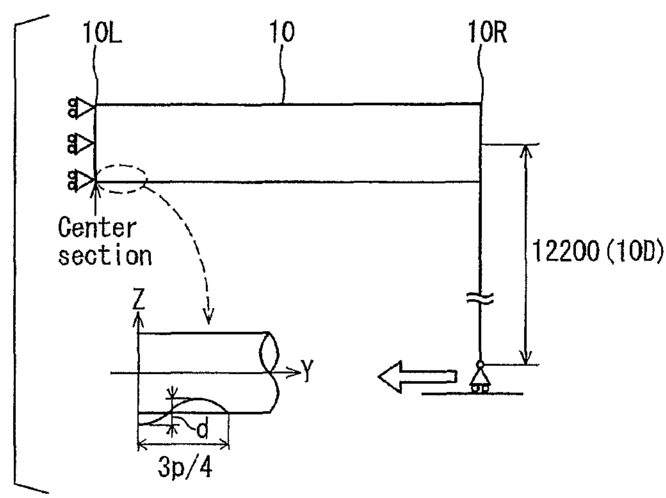
FIG. 7 is a schematic diagram of a FEA model which is used to obtain the graph of FIG. 6.

FIG. 6 is a diagram showing the relationship between bending moment and bending strain of a welded steel pipe having a different undulation wavelength. FIG. 6 is determined by the following method. FEA (Finite Element Analysis) was carried out by using a FEA model 10 shown in FIG. 7. For the FEA, general purpose elasto-plasticity finite element analysis software, MSC.Marc, was used. In the FEA model 10, taking into consideration geometric symmetry, a ¼ portion of the welded steel pipe (a ½ portion in the axial direction and a ½ portion in the radial direction) was modeled. The axial length of the welded steel pipe was 10 times as large as the diameter OD of the welded steel pipe (10 OD). The left end 10L of the FEA model 10 in FIG. 7 corresponds to the center of the welded steel pipe. The right end 10R of the FEA model 10 corresponds to the end of the welded steel pipe. A pressure of 12 MPa was supposed as the internal pressure. A displacement was applied to the right end 10R in the axial direction of the FEA model 10 from a point at a distance of 10 OD downward from the central axis of the FEA model 10. As shown in FIG. 7, as a geometric initial irregularity, an undulation wavelength of 3p/4 having an amplitude peak at the center section was formed on the outer surface of the center section of the welded steel pipe.

The strength grade of the welded steel pipe which is the FEA model was X80 grade (0.2% proof stress is not less than 555 MPa). The outer diameter was 1219 mm (48 in). The wall thickness was 24 mm. The buckling wavelength λ based on Formula (2) was 408 mm.

Two FEA models in which the undulation wavelength p was set to 0.6λ and 1.0λ were analyzed to determine the bending moment and the bending strain in each FEA model. In this occasion, the amplitude "d" of the undulation of the FEA model 10 was constant (0.73 mm=0.06% OD). Based on the obtained results, FIG. 6 was created.

Referring to FIG. 6, the solid line in FIG. 6 indicates a bending moment-bending strain curve in which the undulation wavelength p=0.6λ. The dashed line in FIG. 6 indicates a bending moment-bending strain curve in which the undulation wavelength p=1.0λ. When the undulation wavelength p=0.6λ, the amount of critical bending strain increased compared with the case in which the undulation wavelength p=1.0λ. That is, the buckling resistance of the welded steel pipe was improved more when the undulation wavelength p had a value different from the buckling wavelength λ.

Then, using the FEA model 10 shown in FIG. 7, the critical bending strain at each undulation wavelength p was determined by varying the undulation wavelength p from 0.6λ to 3.0λ. In this occasion, the wall thickness of the welded steel pipe in the FEA model 10 was 24 mm. Moreover, other conditions were the same as the FEA conditions to obtain FIG. 6.

Figure 8:
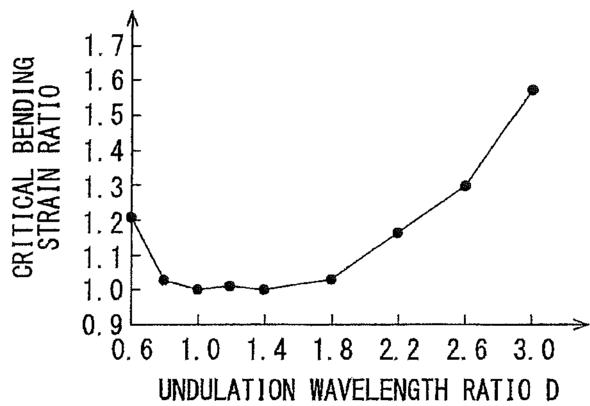
FIG. 8 is a graph showing a relationship between a critical bending strain ratio and an undulation wavelength ratio obtained by using the FEA model of FIG. 7.

FIG. 8 is a diagram to show the above described FEA result. The abscissa of FIG. 8 indicates the undulation wavelength ratio D (unit is non-dimensional) defined by Formula (1).

$$\text{Undulation wavelength ratio } D=p/\lambda \tag{1}$$

The ordinate of FIG. 8 indicates the critical bending strain ratio (unit is non-dimensional) defined by Formula (3).

$$\text{Critical bending strain ratio}=\text{critical bending strain at undulation wavelength } p/\text{critical bending strain when undulation wavelength } p=1.0\lambda \tag{3}$$

Referring to FIG. 8, as the undulation wavelength ratio D increased to more than 1.0, the critical bending strain ratio gradually increased, and when the undulation wavelength ratio D reached not less than 1.8, the critical bending strain ratio remarkably increased with the increase of the undulation wavelength ratio D. On the other hand, as the undulation wavelength ratio D decreased to less than 1.0, the critical bending strain ratio increased, and when the undulation wavelength ratio D reached not more than 0.8, the critical strain ratio remarkably increased with the decrease of the undulation wavelength ratio D.

Further, as will be shown by the below described Example, when the undulation wavelength ratio D was not more than 0.8, or not less than 1.8, it was possible to obtain excellent buckling resistance even if the wall thickness of the welded steel pipe varied.

Therefore, in the pipe expansion step, the welded pipe 12 is expanded over its entire length by using the pipe expanding head 103 such that the undulation wavelength ratio D of the produced welded steel pipe is not more than 0.8, or not less than 1.8. As a result, the buckling resistance of the welded steel pipe will be improved.

To achieve a state that the undulation wavelength ratio D is not more than 0.8, or not less than 1.8, the pipe expansion step includes, for example, a movement pitch setting step and a pipe expansion operation step. In the movement pitch setting step, the movement pitch PI is set such that the undulation wavelength ratio D is not more than 0.8, or not less than 1.8, by adjusting the movement pitch PI to move the pipe expanding head 103. In the pipe expansion operation step, the welded pipe 12 is expanded over its entire length while the pipe expanding head 103 is moved at the set movement pitch PI.

As described above, the undulation wavelength p corresponds to the movement pitch PI. More specifically, the undulation wavelength p is substantially the same as the movement pitch PI.

Therefore, it is possible to easily adjust the undulation wavelength p of the welded steel pipe by adjusting the movement pitch PI.

Further, an undulation extending in the axial direction may be formed in advance on the surfaces of the dies 104 of the pipe expanding head 103. In this case, it is adjusted such that the formed undulation wavelength p is not more than 0.8λ or not less than 1.8λ. When such dies 104 are used, the undulation of the surface of each die 104 is transferred to the welded pipe when the surface of the die forces open the welded pipe, and an undulation wavelength p of not more than 0.8λ or not less than 1.8λ is formed on the inner and outer surfaces of the welded pipe.

Preferably, in the pipe expansion step, the welded pipe is expanded such that the undulation wavelength ratio D of the produced welded steel pipe is not more than 0.8. As shown in FIG. 8, the variation of the critical bending strain ratio associated with the variation of the undulation wavelength ratio is larger when the undulation wavelength ratio is less than 1.0 than when the undulation wavelength ratio D is more than 1.0. For that reason, when the undulation wavelength ratio is not more than 0.8, the buckling resistance remarkably increases. This may be because the smaller the undulation wavelength p is, the higher the rigidity of the welded steel pipe becomes.

More preferably, in the pipe expansion step, the welded pipe is expanded such that the undulation wavelength ratio D of the produced welded steel pipe is less than 0.6. In this case, the roundness of the welded pipe after expansion will be improved.

EXAMPLE

The above described FEA (Finite Element Analysis) was conducted. Specifically, as shown in Table 1, FEA models of Mark 1 and Mark 2 were prepared. The wall thickness of the welded steel pipe of the FEA model of Mark 1 was 18 mm. The wall thickness of the welded steel pipe of the FEA model of Mark 2 was 30 mm. The strength grades and outer diameters for the FEA models of Mark 1 and Mark 2 were the same as those of the above described FEA model of 24 mm wall thickness. Hereafter, the FEA model of 24 mm wall thickness will be referred to as Mark 3.

TABLE 1

| | Strength grade | Outer Diameter of steel pipe (mm) | Wall thickness of steel pipe (mm) | Timoshenko's buckling wavelength (mm) |
|---|---|---|---|---|
| Mark 1 | X80 | 1219 (48 in) | 18 | 355 |
| Mark 2 | | | 30 | 454 |
| Mark 3 | | | 24 | 408 |

Specifically, the strength grade for Mark 1 to Mark 3 was X80 (0.2% proof stress is not less than 555 MPa) and the outer diameter was 1219 mm (48 in). The buckling wavelength λ of Mark 1 was 355 mm, and the buckling wavelength of Mark 2 was 454 mm. The range of the undulation wavelength p to be evaluated by the analysis was from 0.6λ to 3.0λ as with the case of 24 mm wall thickness. Critical bending strain at each undulation wavelength p was determined by the FEA. Then, by using the obtained critical bending strain, a diagram to show the relationship between the undulation wavelength ratio D and the critical bending strain ratio was created.

[Test Results]

Figure 9:
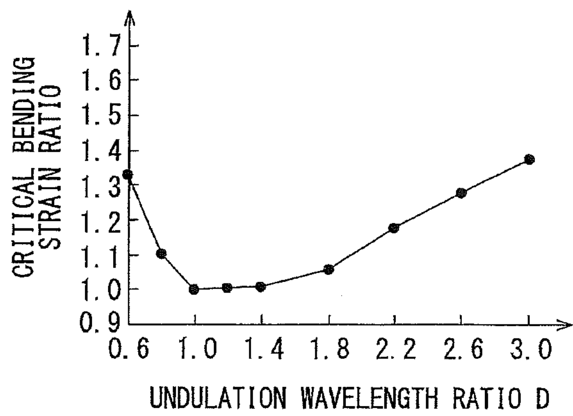
FIG. 9 is a graph showing the relationship between a critical bending strain ratio and an undulation wavelength ratio obtained, by using a FEA model in conditions different from those of FIG. 8.
Figure 10:
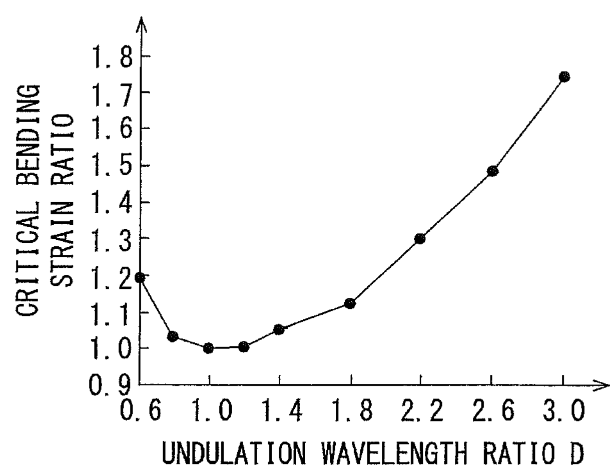
FIG. 10 is a graph showing the relationship between a critical bending strain ratio and an undulation wavelength ratio obtained by using a FEA model in conditions different from those of FIGS. 8 and 9.

FIG. 9 is a diagram showing the relationship between the undulation wavelength ratio D and the critical bending strain of Mark 1. FIG. 10 is a diagram showing the relationship between the undulation wavelength ratio D and the critical bending strain of Mark 2.

Referring to FIG. 9 (Mark 1), FIG. 10 (Mark 2), and FIG. 8 (Mark 3), the critical bending strain ratio remarkably increased when the undulation wavelength ratio D was not more than 0.8 or not less than 1.8, in any of Marks 1 to 3. Moreover, it was revealed that when the undulation wavelength ratio D was not more than 0.8, or not less than 1.8, the critical bending strain ratio reached not less than 1.03. In other words, when the undulation wavelength ratio D was not more than 0.8 or not less than 1.8, the buckling resistance of the welded steel pipe was improved.

Although the embodiments of the present invention have been described so far in detail, those are merely examples and the present invention is not be limited in any way by the above described embodiments.

INDUSTRIAL APPLICABILITY

The present invention is widely usable for the method for producing welded steel pipes, particularly for the method for producing welded steel pipes to be used for pipelines. And more specifically, it is suitable for the method for producing UOE steel pipes.

The invention claimed is:

1. A method for producing a welded steel pipe, comprising the steps of:

preparing a welded pipe; and expanding the welded pipe over an entire length thereof by using a pipe expanding head to form a welded steel pipe such that an undulation wavelength ratio D defined by Formula (1) is not more than 0.8, or not less than 1.8:

$$D=p/\lambda \quad (1)$$

where p is an undulation wavelength in an axial direction of the welded steel pipe, and λ is a Timoshenko's buckling wavelength as defined by the following Formula (2):

$$\lambda=3.44\times(r\times t)^{1/2} \quad (2)$$

where r is an inner radius of the welded steel pipe, and t is a wall thickness of the welded steel pipe.

2. The method for producing a welded steel pipe, according to claim 1, wherein the step of expanding the welded pipe over the entire length thereof comprises the substeps of:

setting a relative movement pitch of the pipe expanding head with respect to the welded pipe such that the undulation wavelength ratio D is not more than 0.8, or not less than 1.8; and expanding the welded pipe over the entire length thereof at the set movement pitch.

3. A welded steel pipe produced by being expanded over an entire length thereof, and having an undulation in an axial direction thereof, wherein an undulation wavelength ratio D determined by the following Formula (1) is not more than 0.8, or not less than 1.8:

$$D=p/\lambda \quad (1)$$

where p is an undulation wavelength of the welded steel pipe, and λ is a Timoshenko's buckling wavelength as determined by the following Formula (2):

$$\lambda=3.44\times(r\times t)^{1/2} \quad (2)$$

where r is an inner radius of the welded steel pipe, and t is a wall thickness of the welded steel pipe.

* * * * *